April 6, 1937.   D. E. LEWELLEN ET AL   2,076,202
SPEED SYNCHRONIZING DEVICE
Filed Nov. 13, 1934   4 Sheets-Sheet 1

INVENTOR
DARCY E. LEWELLEN
EMMONS F. LEWELLEN
BY
ATTORNEYS

April 6, 1937.  D. E. LEWELLEN ET AL  2,076,202
SPEED SYNCHRONIZING DEVICE
Filed Nov. 13, 1934  4 Sheets-Sheet 2
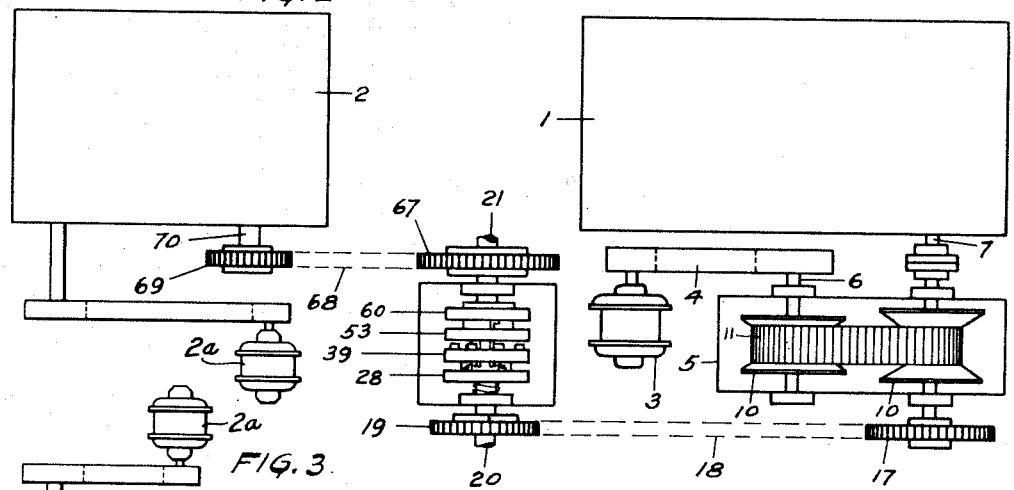
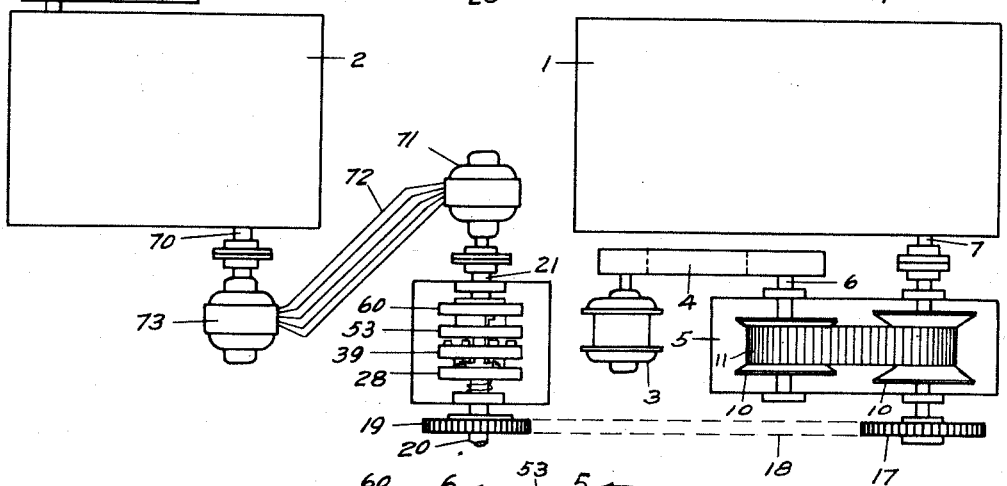
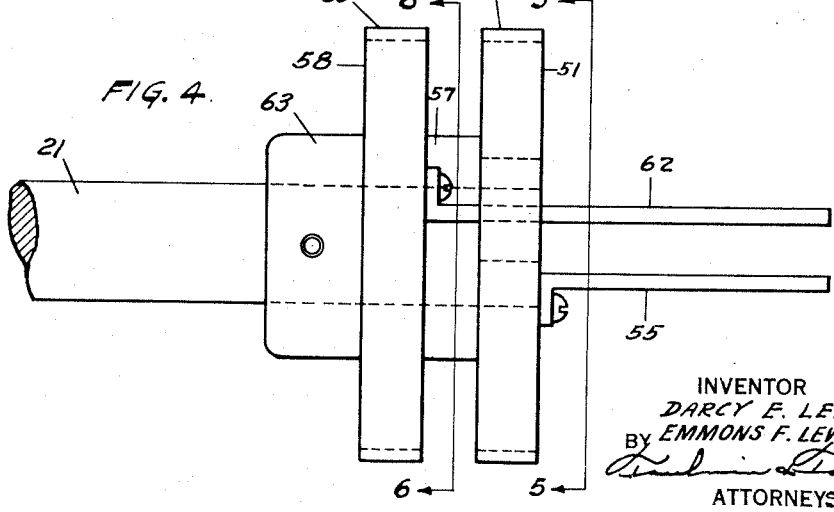
INVENTOR
DARCY E. LEWELLEN
EMMONS F. LEWELLEN
BY
ATTORNEYS April 6, 1937.　　D. E. LEWELLEN ET AL　　2,076,202
SPEED SYNCHRONIZING DEVICE
Filed Nov. 13, 1934　　4 Sheets-Sheet 3
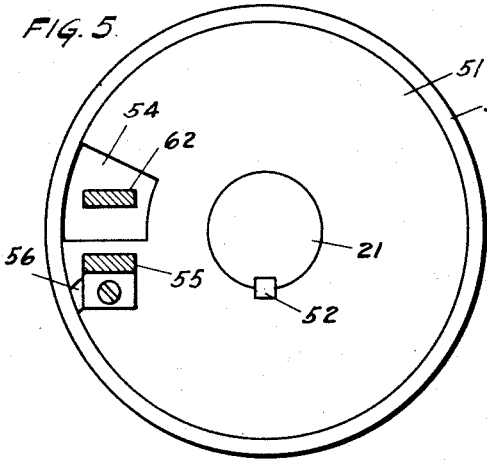
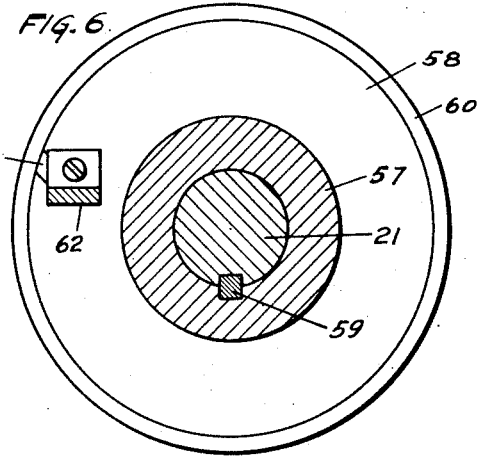
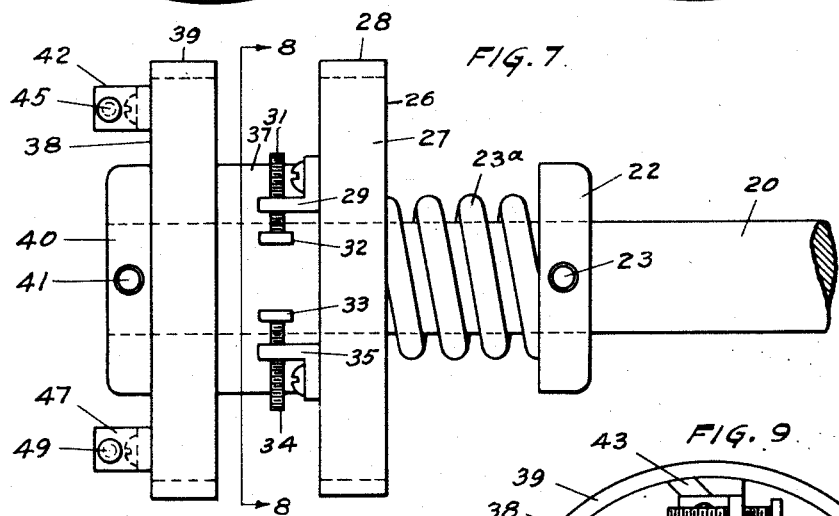
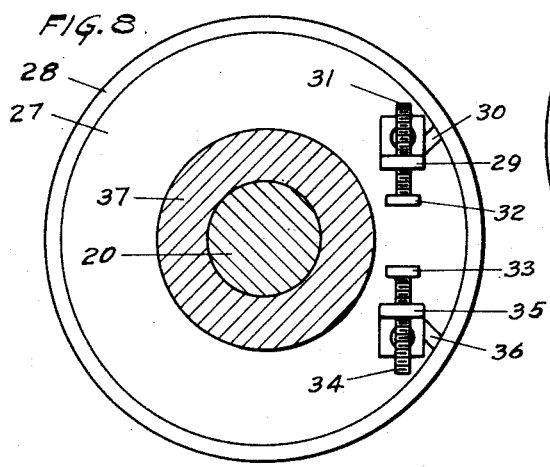
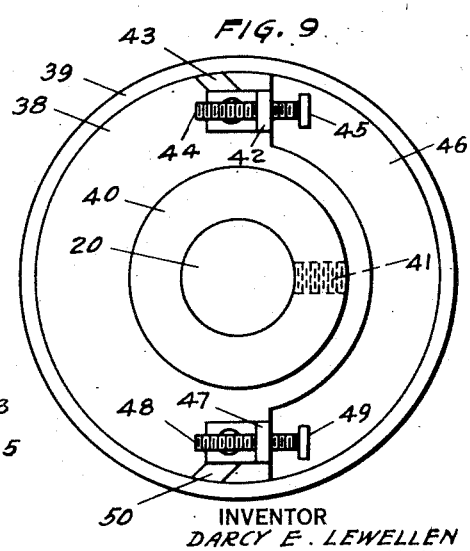
INVENTOR
DARCY E. LEWELLEN
EMMONS F. LEWELLEN
BY
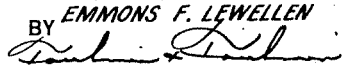
ATTORNEYS

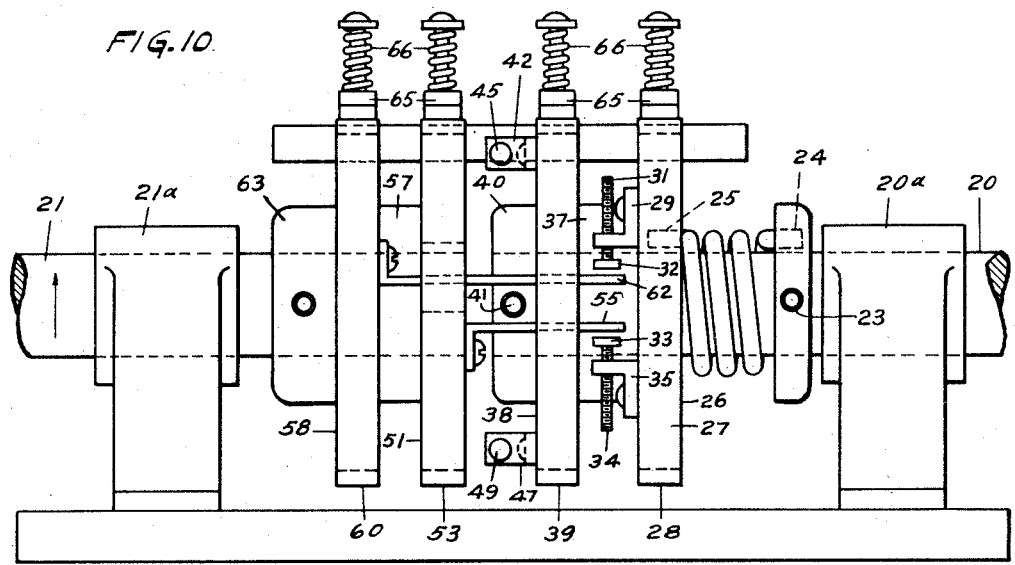
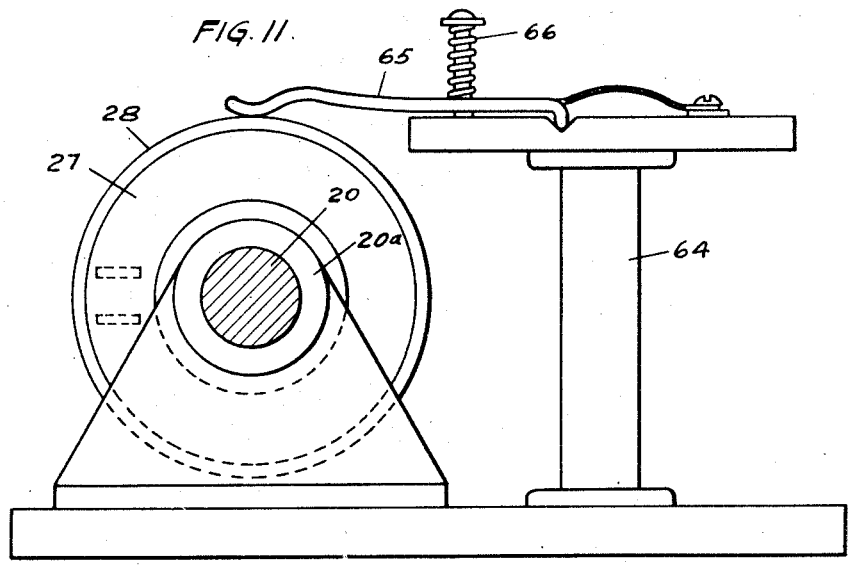

Patented Apr. 6, 1937

2,076,202

UNITED STATES PATENT OFFICE

2,076,202

SPEED SYNCHRONIZING DEVICE

Darcy E. Lewellen and Emmons F. Lewellen, Columbus, Ind.

Application November 13, 1934, Serial No. 752,848

25 Claims. (Cl. 172—293)

The object of this invention is to provide a method and apparatus for the synchronization of speed of two or more devices.

It is the object of the invention to provide means for synchronizing the speed of two revolving shafts in order to maintain a constant speed relationship.

It is a further object to provide means for controlling the speed and changing the speeds of units or processes relative to one another and as a whole.

The purpose of this invention is to cause two shafts to run at exactly the same speeds and is so designed that, in the event one of the shafts changes speed for any reason, the other shaft will automatically be brought to this speed. These shafts will always run at the same speeds, although not connected mechanically in any way.

It is a further object to provide a means of changing the speed of one unit of the apparatus and of bringing the other unit into synchronism with it in its changed speed condition.

In particular, it is the object of this invention to provide an intermittent correction of relative speeds between component parts of a system and then allow an interval of time for the driven machine, such as one of the units of the system, to adjust itself to the new changed speed conditions.

It is an object of this invention to provide means in case the speed of one unit with respect to another is not immediately corrected within the time or space allowed so that there will be a relative adjustment of the controls to establish a new control relationship for the maintenance of synchronous speeds.

It is a further object to provide a method and apparatus so that the entire control system will prevent "surging", that is, the continual change of the driven machine from a fast to a slow speed, or vice versa.

It is an object to provide a system and method by which at predetermined intervals, the frequency of which can be controlled, there will be a constant readjustment of the speed relationships between units of a system so that the adjustments will be relatively small increments.

By this method the result is accomplished of permitting a sufficient time lag between each adjusting step for the accomplishment of the adjustment result in the machine that is being adjusted.

It is a further object to provide a method and apparatus in which a plurality of units of a system, irrespective of the nearness or distance of their physical relationship to one another, can be synchronized from a common source and adjusted in their speed by a speed changer and maintained in synchronism with one another, preferably through a series of intermittent increments of adjustment, which comprehends the adjustment of their relationship to one another and the adjustment of the speed changer to provide a constant speed ratio as desired.

It is a further object to provide means of controlling the interval of intermittent adjustment and the interval of lag between adjustments, during which the adjusted mechanism can accommodate itself to the adjusted condition.

It is a further object to provide for a method and apparatus embodying the above features of control in which there may be either direct mechanical connection between the several controlled units or an electrical connection, or a hydraulic or pneumatic connection, so long as the principles of this invention are employed.

In various manufacturing processes these processes consist of a series of operations on material passing through a number of units on a complete process. It is desirable to maintain a certain speed relation between the various units. At the same time it is also necessary to change the speed of various units or of the processes as a whole and for that reason it is essential that some means be provided for automatically bringing the different units of the process into synchronism in case the speed of one of the units is changed.

Referring to the drawings:

Figure 2 is a diagrammatic plan view showing the prime mover, the speed changer, the synchronizing mechanism and the mechanical connections between the synchronizing mechanism and the respective units of the system, the means for adjusting the speed changer, as shown in Figure 1, being omitted to simplify the view.

Figure 3 is a view similar to Figure 2, showing the connection between the mechanisms, partly mechanical and partly electrical, the electrical mechanism comprising that type of control motor in which the rotor of one motor is electrically synchronized with the rotor of another motor. It will be understood that these connections may be fully electrical rather than partly electrical, as in Figure 3.

Figure 4 is a detail view of the contact disk system with the contact fingers used on one of the shafts in the synchronizing mechanism.

Figure 5 is one of the disks viewed on the line 5—5 of Figure 4 showing the contact fingers in section.

Figure 6 is a section on the line 6—6 of Figure 4 viewed in the direction of the arrows showing the shaft and spacing collar in section and one of the contact fingers in section and one of the contact disks in elevation.

Figure 7 is a side elevation of another of the shafts with the contact disks, spacing collar and clutch spring in elevation. In this form the spring engages by friction one of the contact disks and the restrained collar.

Figure 8 is a section on the line 8—8 of Figure 7 looking in the direction of the arrows, and illustrates the shaft in section, a spacing collar in section and one of the contact disks with its limiting contact points and associated mechanism in elevation.

Figure 9 is a view looking to the right from the left end of Figure 7 showing the other of the contact disks and contact members in elevation constituting a portion of that mechanism. It also shows the end collar associated with that disk in elevation.

Figure 10 is a detailed side elevation of the two shafts of the synchronizing mechanism, which are adjusted in their speed with respect to one another. In this view the clutch spring is shown anchored at either end to the respective anchoring collar and contact disk with which it is associated and, to that extent, this arrangement of springs is a modification of that shown in Figure 7.

Figure 11 is an end elevation with a shaft shown in section of the synchronizing mechanism illustrating the nature of the contact finger and its support with reference to the contact disk with which the contact finger engages.

Figure 1:
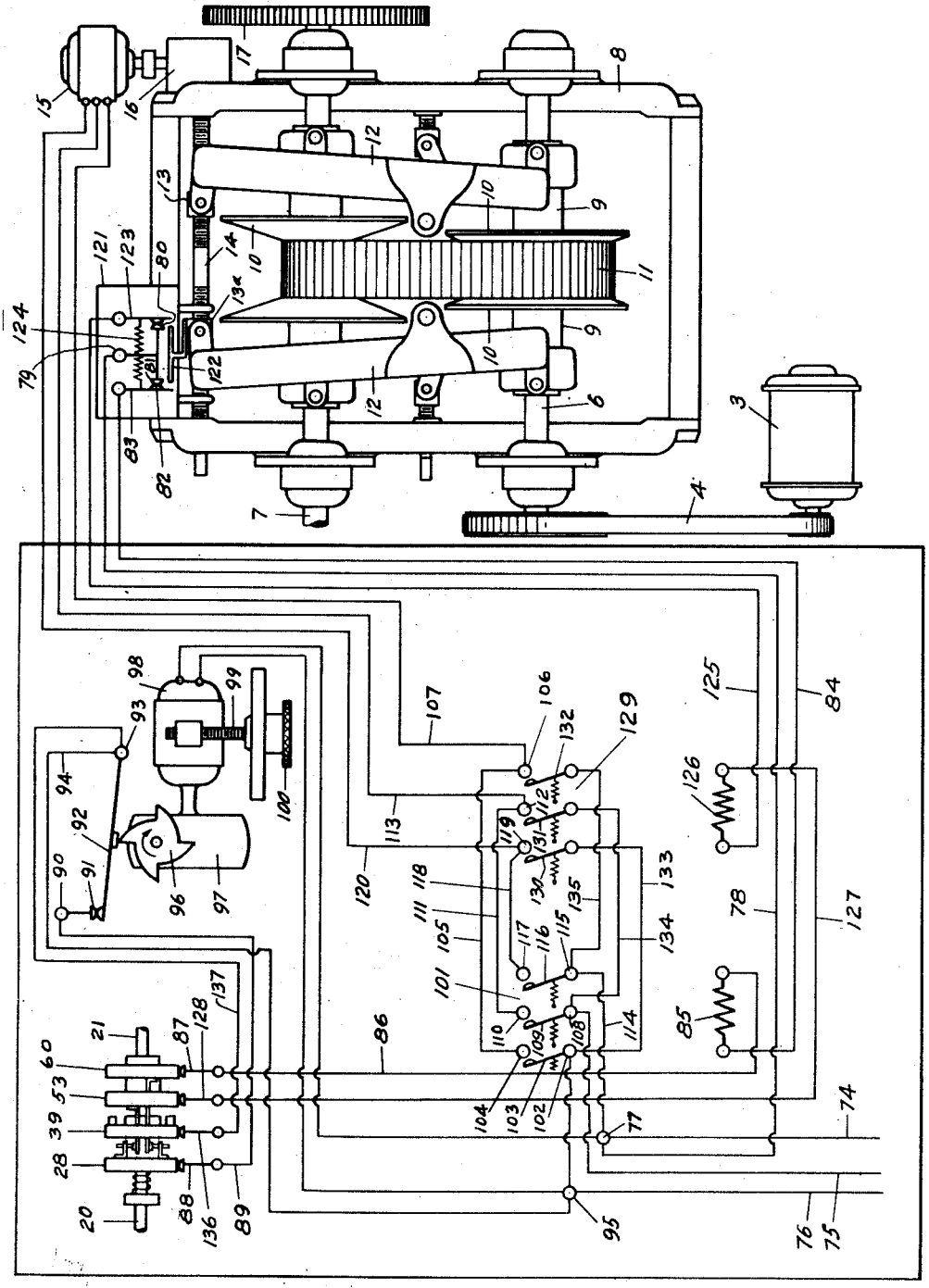
Figure 1 illustrates diagrammatically the relationship of the control circuits and also the application thereto of a speed changing device driven by a prime mover. The heavy box-like line is placed on the left hand side of the drawings to indicate the location of the control system within a box which may be adjacent to or remotely located with respect to the rest of the system.

Referring to the drawings in detail, 1 indicates one of the units of machinery to be controlled. 2 designates a companion unit to the unit 1. It may be any part of a machine or process driven by motor 2a. It is desired that the speed of movement of the mechanism of the respective units be synchronized and maintained in a synchronous relationship.

3 designates a prime mover of any kind, such as an electric motor, which drives through the belt or chain 4 a speed changer generally designated 5.

Speed changer

This speed changer is provided with a pair of shafts 6 and 7 supported in suitable bearings in the frame 8. Each shaft is provided with a pair of slidable sleeves 9 carrying one-half of the pulley 10. Between the halves of the pulley, which form a V-shaped structure, is located a V-belt 11 which connects the two shafts together and causes them to turn together. The distance of the V-belt from the shaft 6 or 7, as the case may be, and which is determined by the spacing between the halves of the pulley, determines the relative speed ratio between the shafts 6 and 7. This shifting of the pulley halves is controlled by a pair of pivoted arms 12, the free ends of which are pivotally mounted on screw blocks 13 carried on the adjusting screw 14. As this adjusting screw is rotated, these blocks are brought closer together or moved further apart depending upon the direction of rotation of the screw rod 14. Thus, the speed of the shaft 7 with relation to the speed of the shaft 6 which has a constant speed is varied. When the faces of the pulley halves 10 mounted on the shaft 7 are moved apart, the speed of the shaft 7 is increased and, when these halves are moved together, the speed is decreased. Thus, this speed changer has a constant speed driving shaft and a variable speed driven shaft.

Pilot motor

The adjusting screw rod 14 is operated, in the present instance, by a pilot motor 15, which operates through a gear reduction 16, which, in turn, is connected to the screw shaft 14. This pilot motor can be operated in either direction so that, as it is operated in either direction, the screw shaft 14 is operated in either direction and the speed of the shaft 7 is correspondingly varied, which, in turn, varies the speed of the unit 1 which is actuated by the shaft 7. The circuit operating and controlling this pilot motor will be described hereinafter.

Synchronizing mechanism

Mounted on the shaft 7 is a driving gear 17 which drives through a chain 18 a gear 19. This driving connection may be of any desired type other than purely mechanical as illustrated. The gear 19 is mounted upon a controlled shaft 20. It is arranged in alignment with but disconnected from a companion controlling shaft 21. The use of the terms "controlling" and "controlled" is purely arbitrary in order to have some convenient designation for these two shafts. The shaft 20 is provided with a collar 22 fixed thereon by the set screw 23. Abutting against the collar 22 and inserted on the shaft 20 is a helical spring 23a which either rests against the face of the collar, as shown in Figure 7, or may have its free end inserted in the collar, as at 24. The latter arrangement is shown in Figure 10. The other end of this spring in Figure 10 is inserted at 25 within the contact disk 26. In the form shown in Figure 7 the spring 23 merely rests against this disk 26. The disk 26 comprises an annular body of insulation material 27 having a band on the periphery of metal for contact purposes, designated 28 (Figures 7 and 8). This disk of insulating material on one side thereof carries an angular bracket 29 connected by the strap 30 to the rim 28. It supports a contact screw bolt 31 having a contact head 32.

Spaced from it in opposing relationship is a second contact head 33 on the bolt 34 mounted in the bracket 35 connected to the rim 28 by the plate 36.

This disk 26 is spaced from the next succeeding disk by a collar 37. This collar 37 engages with the face of the next adjacent disk composed of an annular body of insulation 38 having an exterior band of metal 39. This disk is retained on the shaft 20 by the end collar 40 retained on the shaft 20 by the set screw 41.

The disk itself has oppositely disposed at approximately 180 degrees a pair of contact supporting brackets (Figure 9). One of these brackets is designated 42 and is connected by the contact strap 43 with the periphery band 39. The screw itself is designated 44 and has a contact head 45. The end of the screw with the contact head extends over one end of a semi-circular space or slot 46 which is bounded on one side by the metal band 39 and on the other side by a portion of the insulation 38.

The other bracket designated 47 carries the screw 48 having the head 49 likewise extending over the space 46. This second bracket is connected by the strap 50 to the band 39. The disks 26 and 38 are mounted loosely on the shaft 20 and may turn with respect to that shaft for the purpose and in the manner hereinafter described.

Turning to the shaft 21 it will be found that it has a pair of such contact disks spaced from one another and arranged as follows.

Mounted on the free end of the shaft 21 is a disk of insulation 51 (Figures 4 and 5). This disk is keyed by the key 52 to the shaft 21. The periphery of the disk is provided with a metal contact band 53. The insulation material is cut away to form a space 54 through which one of the contact fingers projects, such contact finger being carried on the adjacent disk to be described. The face of the disk 51 towards the shaft 20 carries a contact finger 55 which is connected by the strap 56 to the band 53. This disk 51 is spaced by the collar 57 from the next adjacent disk of insulation material 58 which is keyed to the shaft 21 by the key 59. It is provided with a metal contact band 60 connected by a strap 61 to a contact finger 62 which extends towards the shaft 20 through the opening 54 in the disk 51. This disk 58 is positioned by the collar 63.

The respective shafts 20 and 21 are supported in bearings designated 20a and 21a of any desired kind. Both shafts are freely rotatable in such bearings.

Adjacent these shafts is a support 64 carrying a plurality of spring fingers 65 braced by the spring 66 on the surface of the metal bands 28, 39, 53 and 60 of the respective disks. These fingers are connected to suitable circuits hereinafter described.

It will be noted that the contact fingers 62 and 55 extend through the space 46 in the disk 38 and they are adapted to make contact with either the terminals 32 and 33 or the terminals 45 and 49, as will be hereinafter described.

The shaft 21 carries on its other end a gear 67 (Figure 2) which is driven by the chain 68, that is, in turn, driven by a gear 69 mounted on the shaft 70 which is driven in conjunction with the unit designated 2.

In place of the last mentioned mechanical connection of the sprockets and chain, there may be substituted a receiving motor 71 (Figure 3) connected by cables 72 to a transmitting motor 73 which is driven by the shaft 70 of the unit 2. The rotor of the motor 71 is connected to the shaft 21. These two motors are of that type in which the rotor of the receiving motor is always driven at the exact speed of the rotor of the transmitting motor.

*Control circuit*

Power lines 74, 75 and 76 are provided (Figure 1). The power line 74 extends to the junction 77 and thence by line 78 to the terminal 79, which, in turn, is connected to the terminals 80 and 81 which constitute contact points. The terminal 81 engages with the contact 82 of the switch arm 83 which is connected to the wire 84 that is, in turn, connected to the coil 85. This coil is connected by the line 86 to the contact finger 87 riding on the surface of the disk 58 having the contact rim 60. Thence, the current passes through the contact finger 62 to the terminal 32, thence through the band 28 on the disk 27 through the contact finger 88, line 89, terminal 90, terminal 91, switch arm 92, terminal 93, line 94, terminal 95 to the power line 76. The making and breaking of the contacts 91 and 92 is determined by the shape, configuration and number of points on the rotating interrupter cam 96 which is connected to a gear reduction unit 97 that is driven by the motor 98. It is further determined by the position of the motor 98 as it is adjusted vertically by the screw 99 and head 100. This motor runs continuously.

Upon the accomplishment of the closing of the foregoing circuit the coil 85 is energized, which results in the closing of the three-pole switch generally designated 101. This switch is a solenoid switch or a magnetic switch.

The circuits now made by the closing of the switch 101 are as follows: power line 76, terminal 95, terminal 102, switch arm 103, terminal 104, line 105, terminal 106, line 107 to the pilot motor 15; power line 75, terminal 108, switch arm 109, terminal 110, line 111, terminal 112, line 113 to the pilot motor 15. The third circuit thus made is power line 74, terminal 77, line 114, terminal 115, switch arm 116, terminal 117, line 118, terminal 119, line 120 to the motor 15. Conventional springs for opening the switches when the coils 85 and 126 are deenergized are shown.

121 designates a limiting switch. This limiting switch is operated by the shifter arm 122 mounted on the block 13a that constitutes the support for one of the arms 12. This shifter arm 122 serves to open the switch arm 83 or the switch arm 123, which are normally held closed by the spring 124. The switch arms 83 and 123 engage the respective terminals 81 and 80.

For instance, the movement of the arm 122 to the right hand, which would occur when the pulley halves 10 on the shaft 7 come together, would serve to open the contact between the switch arm 123 and the terminal 80, whereas the movement in the other direction would open the contacts 81 and 82, 82 being carried on the end of the arm 83. Consequently, the last mentioned movement will prevent further separation of the pulley halves on the shaft 7 and the movement in the opposite direction at its extreme limit, which results in the opening of the switch arm 123, will limit the movement in that direction.

It will be noted that, at all times, either one or both of the switch arms will be in contacting position.

The gear 19 is driven through the chain 18 by the gear 17 on the shaft 7. The gear 19 operates the shaft 20. Thus, the increase in speed of the shaft 7 resulting from this circuit will tend to increase the speed of the shaft 20 and cause the contact 32 with the finger 62 to be broken and the contact 32 to move away from the finger 62.

If the speed increase at this stage is insufficient to cause the shaft 20 to carry its disk 27 and its contact 32 out of engagement with the contact finger 62, then, upon the remaking of the circuit by the next successive reengagement of the contact 91 and switch arm 92, another increment of speed will be imparted to the shaft 7 and so on progressively until the shaft 20 has advanced sufficiently to break the contact between 32 and 62.

Assuming that the speed of the shaft 21 were reduced, then the contact bar or finger 55 would come in contact with the contact head 33 with this result. The circuit would comprise power line 74, terminal 77, line 78, terminal 79, terminal 80, switch arm 123, line 125, coil 126, line 127, contact finger 128, band 53, contact finger 55, contact head 33, band 28, contact finger 88, line 89, contact 91, switch arm 92, line 94, terminal 95, power line 76. This would result in energizing the coil 126 which would cause the closing of the three-pole switch generally designated 129. When this switch is closed, switch 101 is opened.

Upon the closing of the switch 129 through the switch arms 130, 131, 132, the lines 133, 134 and 135 are connected into the pilot motor lines 107, 113 and 120 and the motor reverses, thereby reversing the movement of the adjusting arms 12 and bringing the faces of the pulley 10 on the shaft 7 closer together reducing the speed of the shaft 7. This continues intermittently until the contact 33 and the contact bar 55 are separated.

In case of a sudden increase in speed of the shaft 21, as compared to the shaft 20, the contact bars 62 and 55 would move around the shaft 20, the contact 62 engaging contact 32 and moving the disk 27 until the contact bar 62 came into engagement with the contact 45. The result would be the formation of the following circuit: power line 74, terminal 77, line 78, terminal 79, contact 81, contact 82, switch arm 83, line 84, coil 85, line 86, contact finger 87, band 60, contact finger 62, contact head 45, band 39, contact finger 136, line 137, terminal 93, line 94, terminal 95, power line 76.

In such case the coil 85 would be energized, the three-pole switch 101 would be closed as described and the pilot motor would operate continuously. This movement would continue until the contact finger 62 was moved out of engagement with the contact head 45.

In case of a sudden decrease of the speed of the shaft 21, as compared to the shaft 20, the contact bar 55 will be brought into engagement with the contact head 49, with the resulting circuit being formed: power line 74, terminal 77, line 78, terminal 79, switch arm 123, through terminal 80, line 125, coil 126, line 127, contact finger 128, band 53, contact finger 55, contact head 49, band 39, contact finger 136, line 137, terminal 93, line 94, terminal 95, power line 76. In that case, the control motor will operate to reduce the speed of the shaft 20, to bring it into synchronism with the speed of the shaft 21.

The result of the foregoing method of operation is that there is provided means for making slight changes in the speed of the shaft 20, in case there is only slight variation from the speed of the shaft 21, by making slight changes to the speed changing motor 15. The amount of these movements is determined by the position of the cam 96 in relation to the switch bar 92. The purpose of the motor 98, and the cam 96 which engages and disengages the switch arm 92 and contact 91 is to provide slight speed changes: and then to allow an interval of time to elapse so that the driven machine can adjust itself to the new changed speed conditions. This is because of the fact that a heavy machine driven from some power source does not instantly change its speed even when a change is made in the speed of the driving mechanism. A slight interval of time must be allowed for the machine to adjust itself at its adjusted speed. In case the speed conditions are not corrected and the shaft 20 is not brought into proper relationship to the shaft 21, the disks 27 and 38 will be revolved on the shaft 20 to permit the contact bars 62 and 55 to come into engagement with the contacts 45 or 49. When this takes place, the speed changing motor 15 is moved continuously until the shafts 20 and 21 are running at approximately the same speed.

Inasmuch as this speed is being changed continuously by the continuous running of the motor 15, too great a speed correction will be made because the shaft 20 will be brought to a speed slightly faster than the shaft 21 in order to disengage the contacts 62 and 45. In addition to this slight excess speed change, the driven machine will increase its speed slightly to reach the new speed ratio of the driving mechanism due to the inertia of the machine.

When this takes place, the disks on the shaft 20 revolve faster than the disks on the shaft 21, and the contact 33 will be brought into engagement with the contact bar or finger 55 and make a slight reduction in speed, with the next engagement of contacts 91 and 92. The purpose of the entire control system is to bring certain parts of different machines or processes into proper speed relationship. A distinctive feature of the control system is the means for preventing "surging".

For instance, on two conveyors handling material, the conveyors having divisions which contain packages and these packages are to be deposited in divisions on a conveyor to which they are transferred. This occurs in packing plants and also in bakeries.

In bakeries they have one machine known as a pan tower which consists of two chains operating over equal size sprockets on a shaft, the conveyor chain links having steel slides mounted on them for carrying pans of biscuits, crackers, or similar material. This pan tower usually operates in a vertical position for carrying the pans to the floors above. Operating with this is another conveyor moving in a horizontal position, this conveyor also having chains with lugs on certain links which push the pans along the conveyor. It is necessary that these pans be deposited on the pan tower conveyor so that they enter at a time when the slides are in the proper position.

If we simply restored the proper speed relation between these conveyors, we would not be accomplishing the result needed, because even though the new speeds were exactly the same, one of the conveyors might be out of step with the other and the pans not enter the steel slides on the pan tower at the proper time.

Our control operates not only to restore the proper speed relationship, but also when the spring illustrated in Figure 10 is used, it restores the former position of the parts. In that case, the controls operate as follows:

Assuming that one of the conveyors is connected to the shaft 21 and the other to shaft 20, (Figure 10); assuming also that the conveyor which drives the shaft 21 increases in speed slightly; in that case, the finger 62 will come into engagement with the contact 32 and before the control can operate it will move the disk 27 around the shaft 20 winding up the spring.

When the control acts to restore the proper speed relationship, the contact between the finger 62 and the contact 32 is not broken until the spring unwinds and restores the disk 27 to its former position on the shaft 20. In other words, the spring shown in Figure 10 provides a yielding positioning device which will always return to its proper position. If the spring illustrated in Figure 7 were used, the instant the speed relationship between the shafts 21 and 20 was restored, the circuit between the contacts 32 and the finger 62 would be broken, whereas when using the spring illustrated in Figure 10 these will not be broken until the disk 27 returns to its former position due to the action of the spring illustrated in Figure 10.

If the intermittent contacting device which operates the contacts 91 and 92 were not used, the driven machine would continually be changing from a fast to a slow speed.

It will be understood that we desire to comprehend within our invention such modifications as may be necessary to adapt it to varying conditions and uses.

Having thus fully described the invention, what is claimed as new and desired to secure by Letters Patent, is:

1. In combination, a controlled machine, a controlling machine, a prime mover for the controlled machine, a speed changer driven thereby connected to the controlled machine, an electric motor for adjusting said speed changer, a switch system for connecting said electric motor to respective circuits for driving it forwardly and backwardly, power circuits connected to said switch system, synchronizing circuits connected to said switch system for selecting one of said switches for determining the direction of motion of the adjusting motor, synchronizing mechanism having parts driven by said respective machines adjacent to one another, electrical contact means carried by said parts adapted to engage one another according to the respective speeds thereof, said electrical contact means being connected to said selective circuits for selecting the switch that determines the direction of the adjusting motor, means for interrupting at predetermined intervals whichever controlling circuit is in operation, whereby the movement of the controlling motor will be by increments, and a limit switch connected in circuit with said motor adapted to operate when the adjustments of the speed changer pass beyond a predetermined point to prevent further adjustment thereof in the direction of adjustment being effected.

2. In combination, a pair of driven means associated but disconnected one with the other, electrical contact means carried on the respective driven means connected to electrical circuits, a mechanically operative multiple speed mechanism connected to one of said means and having a speed-regulating member, an electrical device arranged to adjust said member, electrical circuits interconnecting said electrical contact means and said electrical device to adjust said member in response to the operation of said contact means to advance or retard the speed of one of said driven means, and means for intermittently opening and closing the regulating device circuit whereby to cause the adjustment of the speed of one of the driven means to bring it into synchronism with the other to occur by increments with time lag intervals therebetween.

3. In combination, a pair of driven means associated but disconnected one with the other, electrical contact means carried on the respective driven means connected to electrical circuits, a mechanically operative multiple speed mechanism connected to one of said means and having a speed-regulating member, an electrical device arranged to adjust said member, electrical circuits interconnecting said electrical contact means and said electrical device to adjust said member in response to the operation of said contact means to advance or retard the speed of one of said driven means, means for intermittently opening and closing the regulating device circuit whereby to cause the adjustment of the speed of one of the driven means to bring it into synchronism with the other to occur by increments with time lag intervals therebetween, and means whereby the electrical contacts on one of the driven means may move bodily the electrical contacts on the other driven means to reestablish the relationship therebetween for normal control of speed in the event one of said driven means shall continue to be out of synchronism with respect to the other driven means at the end of one of said intermittent periods of adjustment.

4. In combination, a controlling machine, a controlled machine, a pair of mechanically disconnected shafts operatively connected to said machines, synchronizing switch means arranged between said shafts, said switch means being arranged to close when said controlled machine shaft departs from synchronism with said controlling machine shaft, adjustable speed-changing devices for altering the speed of said controlled machine, electrical means for varying the adjustment of said speed-changing devices, an intermittently-actuated switch in circuit with said electrical adjusting means for causing said adjusting means to be operated at intermittent periods, and means adapted to operate said adjusting means continuously and effective upon said shafts being out of synchronism at the termination of one of said intermittent periods of adjustment.

5. In combination, a controlling machine, a controlled machine, synchronizing switch means arranged between moving parts of said machines, means for driving the controlled machine, mechanical variable speed transmission means interposed between said driving means and the controlled machine and having a movable speed-varying member adapted to adjust said transmission to a multiplicity of speeds, and an electrical device adapted to become operative in response to the operation of said synchronizing switch means to move said speed-varying member to vary the speed setting of said transmission means, whereby to cause the controlled machine to be brought back into synchronism with the controlling machine by mechanical means.

6. In combination, a controlling machine, a controlled machine, synchronizing switch means arranged between moving parts of said machines, means for driving the controlled machine, mechanical variable speed transmission means interposed between said driving means and the controlled machine and having a movable speed-varying member adapted to adjust said transmission to a multiplicity of speeds, an electrical device adapted to become operative in response to the operation of said synchronizing switch means to move said speed-varying member to vary the speed setting of said transmission means, whereby to cause the controlled machine to be brought back into synchronism with the controlling machine by mechanical means, and means for intermittently operating said electrical device for readjustment of the mechanical transmission means by increments of adjustment with a time interval therebetween.

7. In combination, a controlling machine, a controlled machine, synchronizing switch means arranged between moving parts of said machines, means for driving the controlled machine, mechanical variable speed transmission means interposed between said driving means and the controlled machine, electrical means responsive to the operation of said synchronizing switch means arranged to adjust the speed setting of said transmission means, whereby to cause the controlled machine to be brought back into synchronism with the controlling machine by mechanical means, means for intermittently operating said electrical adjusting means for readjustment of the mechanical transmission means by increments of adjustment with a time interval therebetween, and devices adapted to operate said transmission adjusting means continuously and effective during the period that said machines are out of synchronism at the termination of one of said intermittent periods of adjustment, whereby the electrical adjusting means for the transmission means is operated intermittently for the correction of slight asynchronisms of said machines and continuously for abnormal asynchronisms thereof.

8. In combination, a controlling machine, a controlled machine, synchronizing switch means arranged between moving parts of said machines, means for driving the controlled machine, mechanical variable speed transmission means interposed between said driving means and the controlled machine and having a movable speed-varying member adapted to adjust said transmission to a multiplicity of speeds, electrical means responsive to the operation of said synchronizing switch means arranged to move said speed-varying member to vary the speed output of said transmission means, whereby to cause the controlled machine to be brought back into synchronism with the controlling machine by mechanical means, means for intermittently operating said electrical speed-varying member-moving means for readjustment of the mechanical transmission means by increments of adjustment with a time interval therebetween, and means for varying the periods of operation of said intermittent operating means to vary the time interval between adjustments.

9. In combination, a controlling machine, a controlled machine, mechanically disconnected shafts driven by said machines, electrical contact means on said shafts, the electrical contact means on one shaft being adapted to engage and disengage with the electrical contact means on the other shaft responsive to varying relative speeds of said shafts, means to drive the controlled machine, mechanical variable speed transmission means interposed between said driving means and said controlled machine and having a movable speed-varying member adapted to adjust said transmission to a multiplicity of speeds, and electrical means responsive to the operation of said interengaging electrical contact means to move said speed-varying member to vary the speed output of said transmission means, whereby to cause the controlled machine to be brought back into synchronism with the controlling machine by mechanical means.

10. In combination, a controlling machine, a controlled machine, mechanically disconnected shafts driven by said machines, electrical contact means on said shafts, the electrical contact means on one shaft being adapted to engage with the electrical contact means on the other shaft responsive to varying relative speeds of said shafts, means to drive the controlled machine, mechanical variable speed transmission means interposed between said driving means and said controlled machine and having a movable speed-varying member adapted to adjust said transmission to a multiplicity of speeds, electrical means responsive to the operation of said interengaging electrical contact means to move said speed-varying member to vary the speed output of said transmission means, whereby to cause the controlled machine to be brought back into synchronism with the controlling machine by mechanical means, and means for intermittently operating said electrical speed-varying member-moving means for readjustment of the mechanical transmission means by increments of adjustment with a time interval therebetween.

11. In combination, a controlling machine, a controlled machine, mechanically disconnected shafts driven by said machines, electrical contact means on said shafts, the electrical contact means on one shaft being adapted to engage and disengage with the electrical contact means on the other shaft responsive to varying relative speeds of said shafts, means to drive the controlled machine, mechanical variable speed transmission means interposed between said driving means and said controlled machine, electrical means responsive to the operation of said interengaging electrical contact means for adjusting the speed setting of said transmission means so as to cause the controlled machine to be brought back into synchronism with the controlling machine by mechanical means, means for intermittently operating said electrical adjusting means for readjustment of the mechanical transmission means by increments of adjustment with a time interval therebetween, and circuit-closing means associated with said shafts and adapted to be actuated to operate said transmission adjusting means continuously in the event that asynchronism has not been fully corrected at the termination of one of said intermittent periods of adjustment, whereby the electrical adjusting means for the transmission means is operated intermittently for the correction of slight asynchronisms of said machines and continuously for abnormal asynchronisms thereof.

12. In combination, a controlling machine, a controlled machine, mechanically disconnected shafts driven by said machines, electrical contact means on said shafts, the electrical contact means on one shaft being adapted to engage and disengage with the electrical contact means on the other shaft responsive to varying relative speeds of said shafts, means to drive the controlled machine, mechanical variable speed transmission means interposed between said driving means and said controlled machine and having a movable speed-varying member adapted to adjust said transmission to a multiplicity of speeds, and electrical means responsive to the operation of said interengaging electrical contact means to move said speed-varying member to vary the speed output of said transmission means, a plurality of electric circuits connected to said contact means and adapted to be selectively energized and deenergized as said shafts vary in their relative speeds, said circuits being operative to actuate said electrical speed-varying member-moving means selectively in opposite directions to restore said shafts to synchronism.

13. In combination, a controlling machine, a controlled machine, mechanically disconnected shafts driven by said machines, electrical contact means on said shafts, the electrical contact means on one shaft being adapted to engage and disengage with the electrical contact means on the other shaft responsive to varying relative speeds of said shafts, means to drive the controlled machine, mechanical variable speed transmission means interposed between said driving means and said controlled machine and having a movable speed-varying member adapted to adjust said transmission to a multiplicity of speeds, electrical means responsive to the operation of said interengaging electrical contact means to move said speed-varying member to vary the speed output of said transmission means, a plurality of electric circuits connected to said contact means and adapted to be selectively energized and deenergized as said shafts vary in their relative speeds, said circuits being operative to actuate said electrical speed-varying member-moving means selectively in opposite directions to restore said shafts to synchronism, and means for intermittently opening and closing said electric circuits irrespective of which circuit is momentarily selected for actuation by said electrical adjusting means.

14. In combination, a controlling machine, a controlled machine, a prime mover for driving the controlled machine, mechanical variable speed transmission means driven by said prime mover and connected to the controlled machine and having a movable speed-varying member adapted to adjust said transmission to a multiplicity of speeds, an electric motor arranged to move said speed-varying member to vary the speed output of said transmission means, a reversing switch system for energizing circuits connected to said electric motor for driving it forwardly and backwardly, selective synchronizing circuits connected to said reversing switch system for selecting one of said switches to determine the direction of motion of the adjusting motor, synchronizing mechanism having parts driven by said respective machines adjacent one another, and electrical contact means carried by said parts adapted to engage one another according to the relative speeds thereof, said electrical contact means being connected to said selective synchronizing circuits.

15. In combination, a controlling machine, a controlled machine, a prime mover for driving the controlled machine, mechanical variable speed transmission means driven by said prime mover and connected to the controlled machine, an electric motor for adjusting said transmission means, a reversing switch system for energizing circuits connected to said electric motor for driving it forwardly and backwardly, selective synchronizing circuits connected to said reversing switch system for selecting one of said switches to determine the direction of motion of the adjusting motor, synchronizing mechanism having parts driven by said respective machines adjacent one another, electrical contact means carried by said parts adapted to engage one another according to the relative speeds thereof, said electrical contact means being connected to said selective synchronizing circuits, and means for interrupting at predetermined intervals the particular controlling circuit which is in operation.

16. In combination, a pair of mechanically disconnected driven shafts to be synchronized, synchronizing switch means connected between said shafts, adjustable mechanical variable speed transmission means connected to one of said shafts and having a movable speed-varying member adapted to adjust said transmission to a multiplicity of speeds, and electrical means for varying the adjustment of said transmission speed-varying member, said synchronizing switch means being arranged in circuit to energize said electrical adjusting means responsive to the departure of said shafts from synchronism.

17. In combination, a pair of mechanically disconnected driven shafts to be synchronized, synchronizing switch means connected between said shafts, adjustable mechanical variable speed transmission means connected to one of said shafts and having a movable speed-varying member adapted to adjust said transmission to a multiplicity of speeds, electrical means for varying the adjustment of said transmission speed-varying member, said synchronizing switch means being arranged in circuit to energize said electrical adjusting means responsive to the departure of said shafts from synchronism, and an intermittently actuated switch in circuit with said electrical adjusting means for alternately energizing and deenergizing said electrical adjusting means circuit, whereby to cause said adjusting means to be operated at intermittent periods.

18. In combination, a pair of mechanically disconnected driven shafts to be synchronized, synchronizing switch means connected between said shafts, adjustable mechanical variable speed transmission means connected to one of said shafts and having a movable speed-varying member adapted to adjust said transmission to a multiplicity of speeds, electrical means for varying the adjustment of said transmission speed-varying member, said synchronizing switch means being arranged in circuit to energize said electrical adjusting means responsive to the departure of said shafts from synchronism, an intermittently actuated switch in circuit with said electrical adjusting means for alternately energizing and deenergizing said electrical adjusting means circuit, whereby to cause said adjusting means to be operated at intermittent periods, and adjustable means for varying the length of the periods of actuation of said intermittent switch.

19. In combination, a pair of mechanically disconnected driven shafts to be synchronized, synchronizing switch means connected between said shafts, adjustable mechanical variable speed transmission means connected to one of said shafts and having a movable speed-varying member adapted to adjust said transmission to a multiplicity of speeds, electrical means for varying the adjustment of said transmission speed-varying member, said synchronizing switch means being arranged in circuit to energize said electrical adjusting means responsive to the departure of said shafts from synchronism, an intermittently actuated switch in circuit with said electrical adjusting means for alternately energizing and deenergizing said electrical adjusting means circuit so as to cause said adjusting means to be operated at intermittent periods, and adjustable means for separating the parts of said intermittent switch whereby to vary the length of the periods of actuation of said intermittent switch.

20. In combination, a pair of mechanically disconnected driven shafts to be synchronized, synchronizing switch means connected between said shafts, adjustable mechanical variable speed transmission means connected to one of said shafts and having a movable speed-varying member adapted to adjust said transmission to a multiplicity of speeds, electrical means for varying the adjustment of said transmission speed-varying member, said synchronizing switch means being arranged in circuit to energize said electrical adjusting means responsive to the departure of said shafts from synchronism, an intermittently actuated switch in circuit with said electrical adjusting means for alternately energizing and deenergizing said electrical adjusting means circuit, whereby to cause said adjusting means to be operated at intermittent periods, adjustable means for varying the length of the periods of actuation of said intermittent switch, and means associated with said synchronizing switch adapted to operate said transmission adjusting means continuously and effective upon said shafts being out of synchronism at the termination of one of said intermittent periods of adjustment.

21. In combination, a pair of mechanically disconnected driven shafts to be synchronized, driving means for said shafts, synchronizing switch means connected between said shafts, adjustable mechanical variable speed transmission means interposed between one of said shafts and its driving means and adapted to furnish a multiplicity of speeds, a mechanical speed-varying device for varying the speed setting of said transmission means, said synchronizing switch means being arranged to control the energization and operation of said speed-varying device, and a reversible electric motor for operating said speed-varying device, said speed-varying motor being in circuit with said synchronizing switch means and responsive to the action thereof for operation in opposite directions.

22. In combination, a pair of mechanically disconnected driven shafts to be synchronized, driving means for said shafts, synchronizing switch means connected between said shafts, adjustable mechanical variable speed transmission means interposed between one of said shafts and its driving means and adapted to furnish a multiplicity of speeds, an electrically actuated speed-varying device for varying the speed setting of said transmission means, said synchronizing switch means being arranged to control the energization and operation of said speed-varying device, and devices for returning said shafts to their identical original relative positions as well as to a condition of synchronization.

23. In combination, a pair of mechanically disconnected driven shafts to be synchronized, driving means for said shafts, synchronizing switch means connected between said shafts, adjustable mechanical variable speed transmission means interposed between one of said shafts and its driving means and adapted to furnish a multiplicity of speeds, an electrically actuated speed-varying device for varying the speed setting of said transmission means, said synchronizing switch means being arranged to control the energization and operation of said speed-varying device, and devices associated with said synchronizing switch means for returning said shafts to their identical original relative positions as well as to a condition of synchronization.

24. In combination, a controlling machine, a controlled machine, mechanically disconnected shafts driven by said machines, adjustable electrical contact means on one of said shafts, electrical contact means on another of said shafts adapted to engage and disengage said first-mentioned electrical contact means in response to varying relative speeds of said shafts, means to drive the controlled machine, mechanical variable speed transmission means interposed between said driving means and said controlled machine, electrical means responsive to the operation of said interengaging electrical contact means for adjusting the speed setting of said variable speed transmission means, a plurality of electrical circuits connected to said contact means and adapted to be selectively energized and deenergized as said shafts vary in their relative speeds, said circuits being operative to actuate said electrical transmission adjusting means selectively in opposite directions to restore said shafts to synchronism, and means for intermittently opening and closing the actuating electric circuit irrespective of which circuit is momentarily selected for actuation of said electrical adjusting means, said electrical contact means on one shaft being adapted to continuously engage said adjustable electrical contact means on the other shaft during the time the contacts on said shafts move out of their normal relative positions when synchronized, and means for operating the electrical transmission adjustment means continuously in response to the departure of said shafts from synchronism by a predetermined amount, whereby the electrical adjusting means for the transmission operates intermittently for the correction of slight asynchronism of said machines and continuously for abnormal asynchronism thereof.

25. In combination, a controlling machine, a controlled machine, synchronizing switch means arranged between moving parts of said machines, means for driving the controlled machine, mechanical variable speed transmission means interposed between said driving means and the controlled machine, electrical means responsive to the operation of said synchronizing switch means arranged to adjust the speed setting of said variable speed transmission means, whereby to cause the controlled machine to be brought back into synchronism with the controlling machine by mechanical means, means for intermittently operating said electrical transmission adjusting means for readjustment by increments of adjustment with a time interval therebetween, and devices adapted to operate said transmission adjusting means continuously and effective during the time when the controlling and controlled machines are out of synchronism a predetermined amount, whereby the electrical adjusting means for the transmission is operated intermittently for the correction of slight asynchronism of the machines and continuously for abnormal asynchronism thereof.

DARCY E. LEWELLEN.
EMMONS F. LEWELLEN.